US012194762B2

(12) United States Patent
Lucas et al.

(10) Patent No.: US 12,194,762 B2
(45) Date of Patent: Jan. 14, 2025

(54) MEDIA SUPPORT WITHIN A MEDIA PROCESSING DEVICE

(71) Applicant: ZEBRA TECHNOLOGIES CORPORATION, Lincolnshire, IL (US)

(72) Inventors: James Lucas, Coventry, RI (US); Matthew D. Corvese, Warwick, RI (US); Anthony Ross Helberg, Attleboro, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 114 days.

(21) Appl. No.: 17/977,463

(22) Filed: Oct. 31, 2022

(65) Prior Publication Data

US 2024/0140118 A1 May 2, 2024

(51) Int. Cl.
*B41J 29/02* (2006.01)
*B41J 3/36* (2006.01)
*B41J 11/00* (2006.01)

(52) U.S. Cl.
CPC ................. *B41J 29/02* (2013.01); *B41J 3/36* (2013.01); *B41J 11/005* (2013.01)

(58) Field of Classification Search
CPC ............. B41J 29/02; B41J 3/36; B41J 11/005
See application file for complete search history.

(56) References Cited

U.S. PATENT DOCUMENTS

| | | | | |
|---|---|---|---|---|
| 6,609,844 | B1 * | 8/2003 | Petteruti | B41J 3/36 400/613 |
| 2004/0018035 | A1 | 1/2004 | Petteruti et al. | |
| 2013/0265377 | A1 | 10/2013 | Kokawa et al. | |
| 2013/0270386 | A1 * | 10/2013 | Tanaka | B41J 15/042 242/570 |
| 2017/0057263 | A1 * | 3/2017 | Vo | H02J 7/0048 |
| 2018/0297380 | A1 * | 10/2018 | Ikemoto | B41J 3/36 |
| 2019/0308428 | A1 | 10/2019 | Kanda et al. | |
| 2021/0403265 | A1 | 12/2021 | Ji | |

FOREIGN PATENT DOCUMENTS

JP 2015229257 A 12/2015

OTHER PUBLICATIONS

International Search Report and Written Opinion for International Application No. PCT/US2023/035724 mailed on Feb. 7, 2024.

* cited by examiner

*Primary Examiner* — Sharon Polk

(57) ABSTRACT

An embodiment of the present invention includes a media processing device comprising: a housing; a media bay within the housing, the media bay configured to receive media; a media centering assembly within the media bay, the media centering assembly comprising: a first support; and a first strut attached to the first support, wherein the first strut is configured to stabilize the first support via contact between a ground strip and the first strut.

19 Claims, 6 Drawing Sheets

MEDIA SUPPORT WITHIN A MEDIA PROCESSING DEVICE

FIELD OF INVENTION

An example disclosed embodiment relates generally to media processing devices and more specifically to durable mobile printers structured to maintain an operational status after impacts.

BRIEF DESCRIPTION OF THE DRAWINGS

Reference will now be made to the accompanying drawings, which are not necessarily drawn to scale, and wherein.

BRIEF SUMMARY

Media processing devices, such as printers, are used in a variety of applications and environments. Mobile printers may be subjected to unexpected impacts and drops while in operation or transit which may result in excessive movement of components, resulting in components disassembling, misaligning, or breaking.

Such damage to components may result in printer failure and necessitate replacement of the components, possibly at considerable expense and significant downtime for the printer. For example, excessive movement during impacts or drops can result in damage to print alignment features and/or media holding elements. Additionally, excessive stress within components caused by impacts and drops may cause material failure of the components.

Within a printer, it is desirable to allow media holding elements to translate freely to allow the media holding elements to secure a media roll. However, in allowing the media holding elements to translate within the printer, the media holding elements are unable to have additional structural elements as motion could be limited.

It is advantageous to media support design within a printer to allow for a support structure that is mobile within the printer along with the media support that could move freely but then provide support when movement is no longer needed.

In one embodiment disclosed herein, a media processing device includes: a housing; a media bay within the housing, the media bay configured to receive media; a media centering assembly within the media bay, the media centering assembly including: a first support; and a first strut slidably engaged with the first support, wherein the first strut is configured to stabilize the first support via contact with a strip disposed in the media bay and the first strut.

In another embodiment disclosed herein, a media processing device includes: a lid rotatable rotatable between an open position and a closed position; a ground strip; and a media centering assembly including: a first support within a first guide slot, wherein the first support is configured to translate within the first guide slot; a first strut slidably contained within the first support; and a biasing element positioned between a surface of the first strut and the first support, the biasing element configured to bias the first strut away from the ground strip, wherein, when the lid is in the closed position, the lid contacts the first strut and forces the first strut against the ground strip.

DETAILED DESCRIPTION

Figure 1:
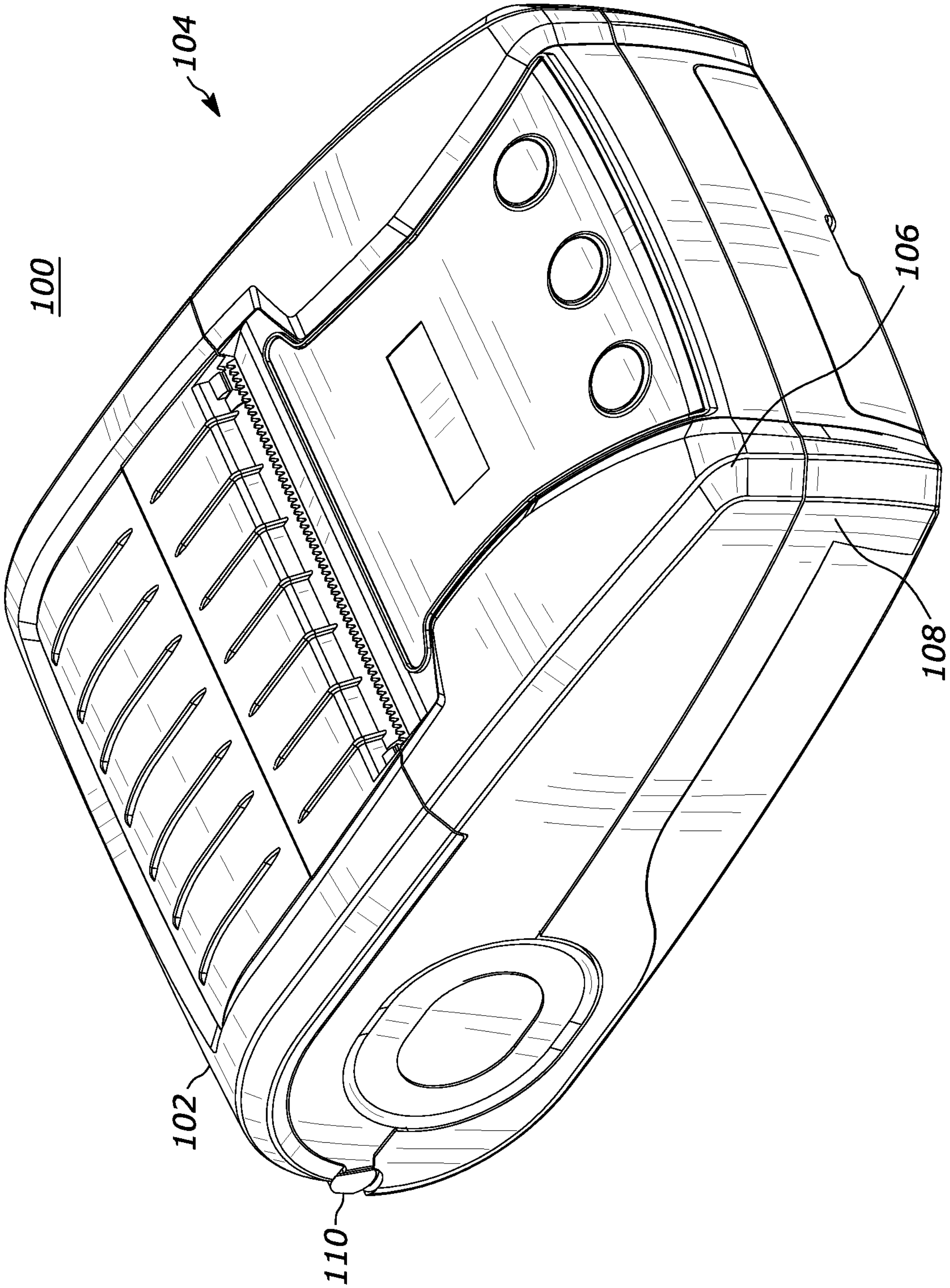
FIG. 1 illustrates an example printer in accordance with an examples disclosed herein.

FIG. 1 depicts an example printer 100. The printer 100 as shown in FIG. 1 is a direct thermal printer, however embodiments disclosed herein may be implemented in any suitable media processing device such as a thermal transfer printer, a tabletop printer, a mobile printer, a RFID encoder, or any other type of device that can be used process media. The printer 100 comprises a housing 104 which comprises an upper housing 106 and a lower housing 108. The printer 100 further includes a lid 102 which is rotatably attached to the printer 100 via hinge 110. The lid 102 is configured to pivot open via actuation of an opener on the printer (not shown in FIG. 1). As will be described further below, the lid 102 is configured to pivot to an open position such that a user may access an interior media bay for loading or unloading of media to be processed by the printer 100.

As illustrated in FIG. 1, the upper housing 106 and the lower housing 108 comprise a sturdy material such as plastic or fiberglass. In the illustrated embodiment, the upper and lower housing also comprises a molded overlay comprising a material with sufficient resilience to provide non-nominal protection to the printer during cases of physical shock such as drops, falls, or other contact types.

Figure 2:
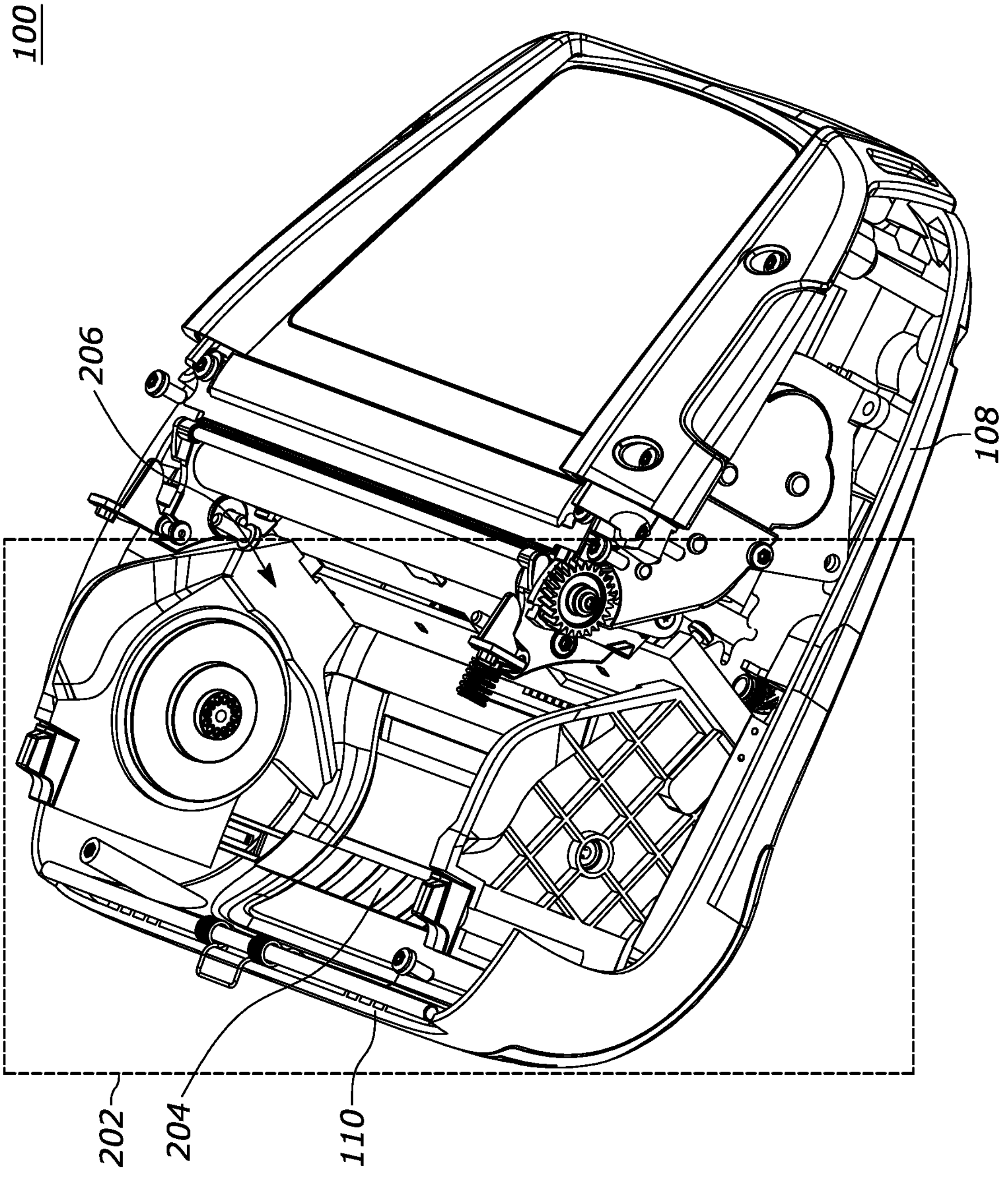
FIG. 2 illustrates the example printer of FIG. 1 with the lid removed to illustrate inner components thereof.

FIG. 2 illustrates the printer 100 of FIG. 1 with the lid 102 and the upper housing 106 removed for illustration purposes. As illustrated in FIG. 2, the printer 100 includes a media bay 206 to receive media for processing by the printer 100. A media centering assembly 202 is supported within the media bay 206.

The media centering assembly 202 is a system within the printer 100 configured to receive media such that the media centering assembly 202 supports the media within the media bay 206. The media centering assembly 202 maintains the media in a centered position within the media bay 206 such that the media is dispensed aligned and centered via media guides from the printer 100.

The printer 100 further includes a ground strip 204 as illustrated in FIG. 2. The ground strip 204 as depicted comprises a molded strip from the molded overlay described above such that the molded over lay was configured to be present within a slot in the lower housing 108. The ground strip 204 will be described in further detail below.

Figure 3:
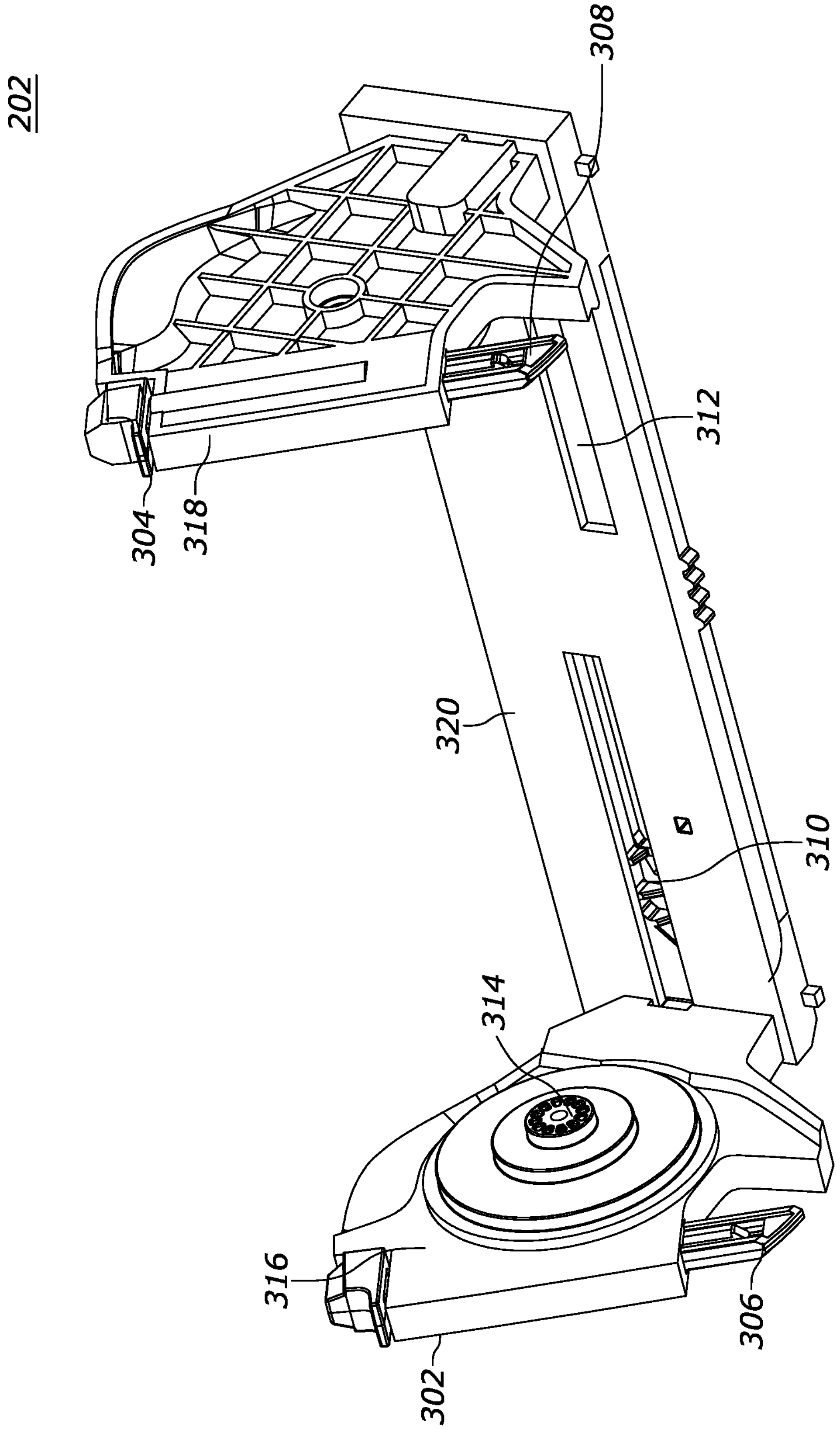
FIG. 3 illustrates an example media centering system in accordance with an example embodiment.

In FIG. 3, the media centering assembly 202 is shown in a fully opened position. The media centering assembly 202 comprises a first support 302 and a second support 304 (together known as supports). Each support 302, 304 comprise a strut 306, 308, respectively (collectively known as struts), and a media spindle 314. In other embodiments, the media centering assembly 202 has two supports with one strut.

The media spindle 314 of FIG. 3 is configured to be rotatably attached to the first support 302. The media centering assembly 202 further includes a first guide slot 310 and a second guide slot 312 disposed within an assembly body 320. The guide slots 310, 312 are configured to allow movement of the supports 302, 304, respectively, such that each support may only move either closer together or further apart. The movement of the supports 302, 304 is configured such that the media centering assembly 202 can receive multiple sizes of media. The supports 302, 304 can be pulled apart to allow for media to be installed between the supports 302, 304 and then the supports 302, 304 move back towards each other until each contacts an opposite end of the installed media roll. For example, if, in the open position, the supports 302, 304 can receive media being four inches wide, and conversely, when media is installed being only two inches wide, the supports 302, 304 can be translated inward to effectively "hold" a roll of media between the supports 302, 304. When a roll of media is pinched between the supports 302, 304, the media spindle 314 is configured to fit within a spool of the roll of media and support the roll via the media spindle 314 protruding the roll from each end.

Because of the nature of the supports 302, 304 within the media centering assembly 202, the supports 302, 304 experience issues during drops of the printer 100 as the supports 302, 304 may inadvertently shift or skew within the media bay 206. As will be described in further detail below, the first strut 306 and the second strut 308 are incorporated into the first support 302 and the second support 304, respectively. The struts 306, 308 aid in providing rigidity to the media centering assembly 202 by engaging with the inner walls of the printer 100 within the media bay 206. The struts 306, 308 wills be described in further detail below.

As illustrated in FIG. 3, a first channel 316 and a second channel 318 are located within the first support 302 and the second support 304, respectively. In the depicted embodiment, the first strut 306 is received within the first channel 316 and the second strut 308 is received within the second channel 318. The struts 306, 308 are free to translate along the respective channels 316, 318. As will be described further below, within the channels 316, 318, the strut 306, 308 is biased towards the lid 102.

Figure 4:
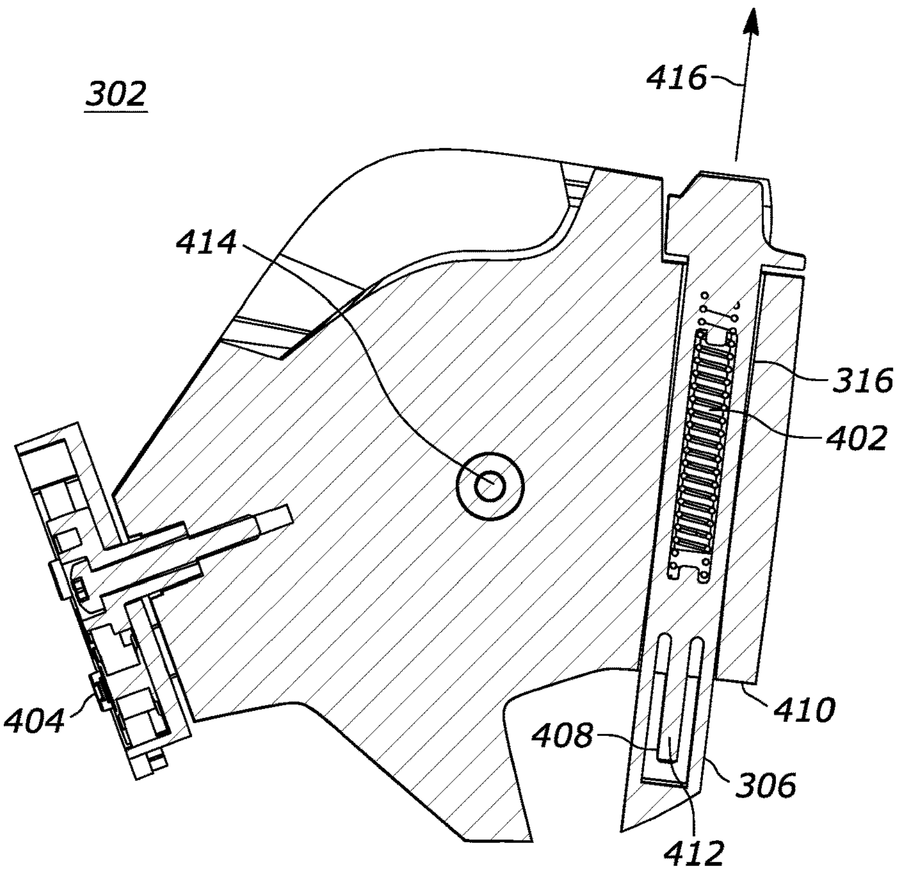
FIG. 4 is another view of the media centering system of FIG. 3.

FIG. 4 illustrates a side view of the media centering assembly 202 which includes a side view cross section of the first support 302. The first channel 316 of the first support 302 is shown bisected with the first strut 306 disposed within the first channel 316.

A biasing element 402 is integrated with the first strut 306. The example biasing element 402 of FIG. 4 is a tension spring, however in other embodiments the biasing element 402 may be a compression spring, a leaf spring, or any other type of biasing element capable of exerting lateral forces. The biasing element 402 is coupled with one end on the first strut 306 and the other end on the first support 302. The biasing element 402 provides a force on the first strut 306 in the direction indicated by arrow 416 (i.e., toward the lid in the closed position). The biased first strut 306 pushes up against the lid 102 when the lid 102 is in the closed position. The biased first strut 306 pushing against the lid 102 assists a user in opening the lid 102. The biasing elements 402 is configured to raise the strut 306 when the lid 102 is opened, which in turn pulls the first strut 306 away from contact with a wall of the media bay 206. This process will be discussed further below.

FIG. 4 further illustrates the first strut 306 having a first retaining element 408 located at an end of a first prong 412 of the first strut 306. The first retaining element 408 prevents the first strut 306 from being easily removed by contacting a support surface 410 of the first support 302. In the illustrated embodiment, the first retaining element 408 is a tab located at the end of the first prong 412 which extends perpendicularly from the length of the first prong 412. While the retaining element 408 is shown at the bottom of the first prong 412 of the first strut 306, it is appreciated that the retaining element 408 may be located anywhere on the first strut 306 such that the retaining element 408 can deflect to allow insertion of the first strut 306 into the first channel 316 and then return to a position such that the first prong 412 is in position to contact the first support 302 during removal of the first strut 306.

FIG. 4 further depicts a side view of a cross section of the guide support 404. The guide support 404 supports the first support 302. The guide support 404 holds the first support 302 in place while allowing the first support 302 to slide within the first guide slot 310. The second support 304 is held by similar means within the second guide slot 312, as shown in FIG. 3.

The media spindle 314 as depicted in FIG. 3 is supported on the first support 302 via a fastener 414, which is depicted in FIG. 4. The fastener 414 allows for rotational movement of a media roll supported by the media spindle 314. The media roll (not shown) is installed prior to operation of the printer 100. The media roll is installed such that a central, long axis of the media roll extends from the media spindle 314 of the first support 302 to the media spindle 314 attached to the second support 304. During retention, the first support 302 and the second support 304 are configured to translate inward to fit against ends of the media roll. Means within the media centering system 202 act to hold the supports 302, 304 in place when translated in against the media roll, such as, said means to include rack and pinions, lugs and belts, or spring biasing, among others.

Figure 5:
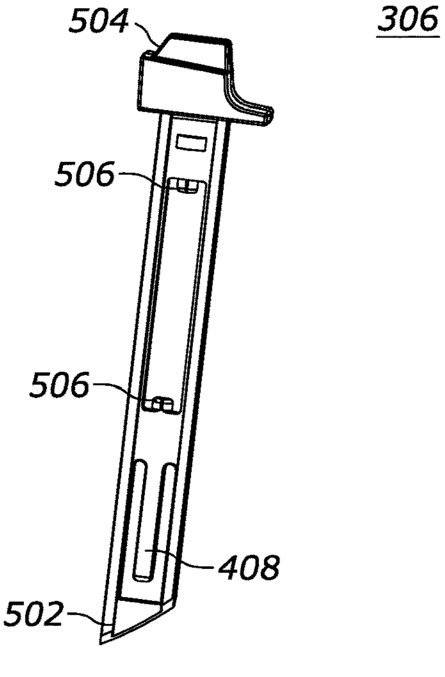
FIG. 5 illustrates an element of the example media centering system of FIGS. 3 and 4.

FIG. 5 illustrates an example embodiment of the first strut 306. The first strut 306 as illustrated includes biasing element supports 506 configured to maintain alignment of the biasing element 402 with the first strut 306.

The first strut 306 further includes a ground contact 502 and a lid contact 504. The first strut 306 is designed such that the ground contact 502 is positioned to be near a wall of the media bay 206. The ground contact 502 is configured to be pressed against the wall of the media bay 206 to provide additional structural support for the supports 302, 304 of the media centering assembly 202. The lid contact 504 is positioned on an opposite end of the first strut 306 from the ground contact 502. The lid contact 504 is configured to receive a force from the lid 102 and direct that force through the first strut 306 to the ground contact 502.

Conversely, as the lid 102 in forces the first strut 306 downward, the first strut 306 is forced by the biasing element 402 to apply a force in return at the lid 102. The force applied by the first strut 306 towards the lid 102 does not move the lid 102 while the lid 102 is latched to the lower part 108 of the housing 104. However, once a user actuates a lid latch to move the lid 102 to the open position, the struts 306, 308 aids in the movement of the lid 102 to the open position. The struts 306, 308 providing the force on the lid 102 provides the user an easier opening experience of the lid.

Figure 6:
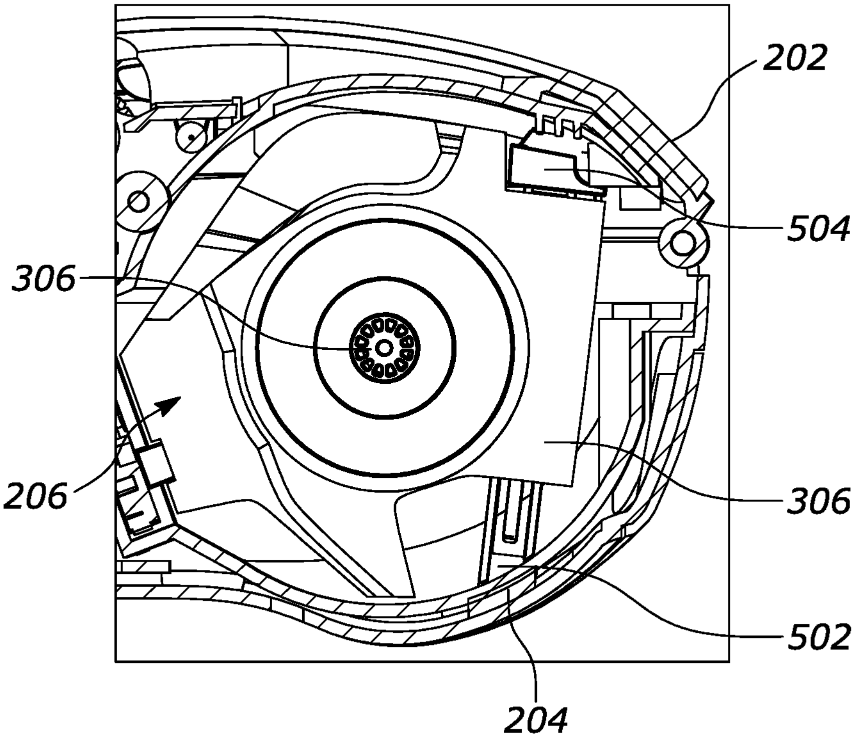
FIG. 6 illustrates an example media bay of the example printer of FIG. 1.
Figure 7:
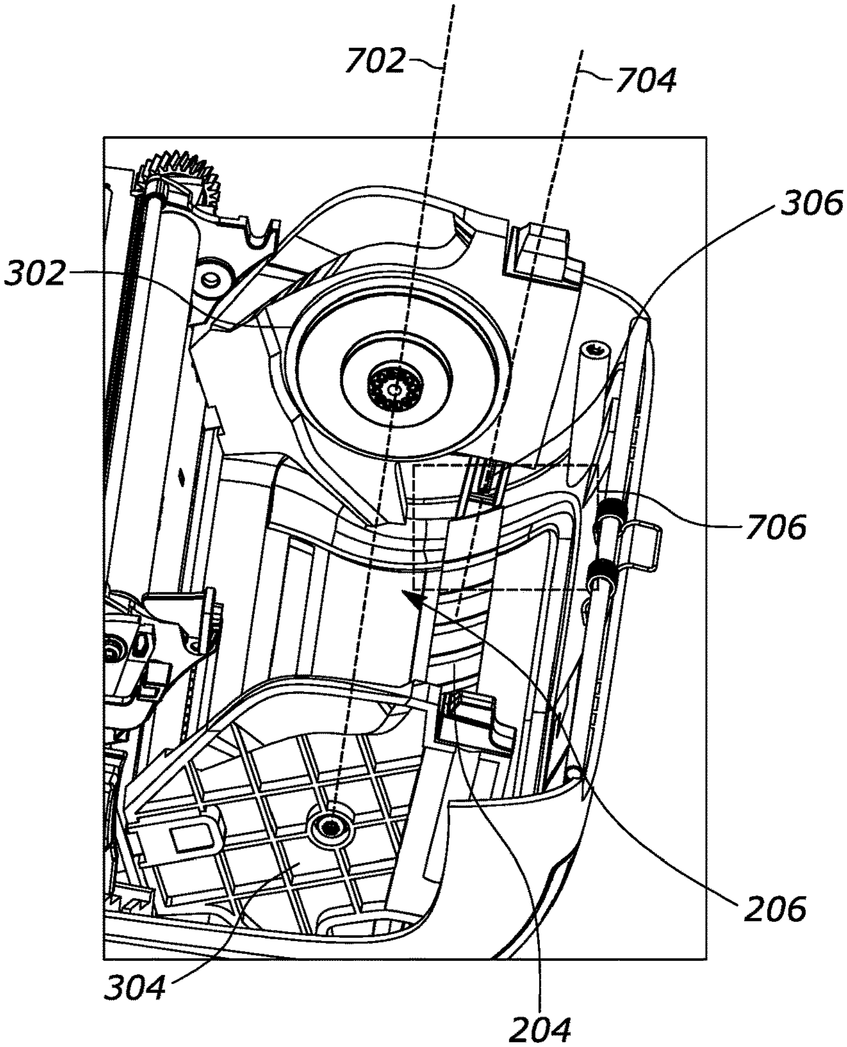
FIG. 7 is another perspective of the media bay shown in FIG. 6.

FIG. 6 illustrates an axial view of the example media bay 206. The axial view of the media bay 206 shows the juxtaposition of the direction of the support from the media spindle 306 against the support from the strut 306. As can be seen in FIG. 7, a media axis 702 passes from the first spindle 306 to the second spindle (not shown), representative of the long axis 702 of a media roll installed in the printer 100. A strut axis 704 is aligned with a longest dimension of the struts 306/308. The strut axis 704 and the media axis 702, as illustrated in FIG. 7, are perpendicular in alignment. The relative axis alignments provide support for the media roll in a variety of directions which further aids in support during falls.

While the strut 306 is designed to be pressed against the inner wall of the media bay 206, in some embodiments, the inner wall of the media bay 206 is a hard plastic surface, which may be difficult for the strut 306 to find purchase. The strip 204 is disposed on the inner wall of the media bay 206 and is made of a resilient, deformable strip material. In some embodiments, the strip material is part of the over mold from the outside of the printer 100, wherein the printer 100 has an aperture that allows the over molding to cover the outside of the printer 100 and still be accessible from the interior of the printer 100.

FIG. 7 illustrates the media bay 206 of the printer 100. A media axis 702 is illustrated aligning from the first media spindle to the second media spindle. The media axis 702 aligns with a center of a media roll supported in the media bay 206. The media axis 702 aligns with the force provided by the supporters 302/304. In other words, the media roll is supported between the first and the second supporters 302/304. Therefore, by further bracing the first and second supporters 302/304, the printer 100 is better able to handle falls and tumbles. As illustrated in FIG. 7, the first strut 306 braces the first support 302 via the strut being pressed by the lid 102 into contact with the media bay 206 wall. The contact between the first strut 306 and the media bay 206 is highlighted by the contact area 706. The contact area 706 is depicted in further detail in FIG. 8.

Figure 8:
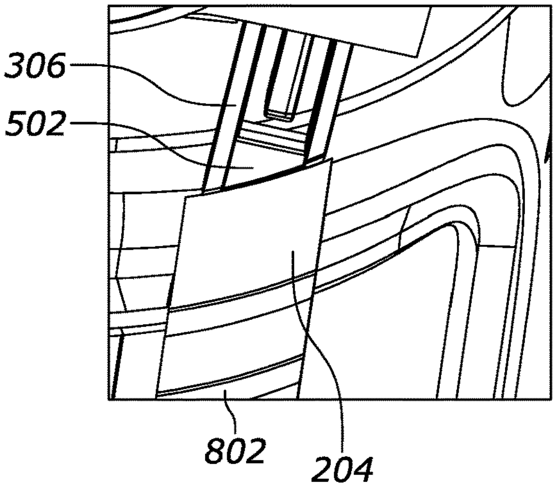
FIG. 8 is an enhanced view of the media bay shown in FIG. 7.

FIG. 8 depicts an enhanced view of the contact area 706 as shown in FIG. 7. As depicted, the strut 306 is contacting the strip 204. As described above, the strut 306 is forced into contact via the closing of the lid 102. As can be seen in FIG. 8, the strip 204 further includes a retaining notch 802. In embodiments featuring the retaining notch 802, when the strut 306 is engaging with the strip 204 and the strut 306 is within a retaining notch 802, the retaining notch 802 acts to further retain the strut 306 to provide additional structure to the supports 302/304. When the struts 306/308 contact the wall of the media bay 206, the struts 306/308 is pressed between the lid 102 and the media bay wall 206.

As illustrated in FIG. 7, the strut axis 704 passes from a contact point between the lid and the top of the strut 306 through the bottom of the strut 306 where the strut 306 contacts the wall of the media bay 206. In some embodiments, a strip 204 is disposed on the wall of the media bay 206. The strip 204 includes a material that has a higher coefficient of friction than the wall of the media 206. In some embodiments, the strip 204 is a rubbery, molded overlay and the wall of the media bay 206 includes hard smooth plastic. While the strut 306 can provide support being structured against the smooth plastic of the media bay 206, the additional friction provided by the strip 204 allows the strut 306 to require additional force to move relative to the strip 204.

As depicted in FIG. 7 and FIG. 8, the supporter 302 is spaced to a far opposite sides of the media bay 206 from supporter 304. The supporters 302/304 are spaced in the illustrated embodiment to allow for a roll of media to be installed along the media axis 702 where struts 306/308 are aligned with an outer edge of the strip 204. The supporters 302/304 are then translated towards the media roll until the supporters 302/304 are holding the media roll within the media bay 206, with the supporters remaining stationary within the media bay 206 once the media roll is supported. Once the supporters 302/304 are in place and the lid 102 is closed, the struts 306/308 engage the strip 204 to further strengthen the supporters 302/304. While in some embodiments, the struts 306/308 are braced against the hard plastic of the media bay wall, in others the struts 306, 308 are pressed against the strip 204 and in others still the struts 306, 308 find additional purchase in the retaining notch 802, wherein each additional element provides additional strength to the media centering assembly. The supporters 302/304 are able to maintain some pressure along the media axis 702, however, during drops or shocks to the printer 100, the supports may come loose and be unable to hold the media roll.

In some example embodiments, additional design features and materials may be used to provide added strength in typical breakage areas. For example, a display module may use impact modified glass, cover latch hooks may be composed of steel or similar materials, a gear train may be defined with a steel rear post and wider gears for added strength, and outer housings may be constructed with high impact modified polycarbonate with thermoplastic elastomer (TPE) over-mold.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A media processing device comprising:
- a housing;
- a media bay within the housing, the media bay configured to receive media;
- a media centering assembly within the media bay, the media centering assembly comprising:
  - a first support; and
  - a first strut slidably engaged with the first support, wherein the first strut is configured to stabilize the first support via selective contact with a resilient strip disposed in the media bay and the first strut, the first strut deforms the resilient strip in response to the first strut contacting the resilient strip.

2. The media processing device of claim 1, wherein the media centering assembly comprises:
- a second support; and
- a second strut attached to the second support, wherein the second strut is configured to stabilize the second support via contact between the strip and the second strut.

3. The media processing device of claim 2, wherein the first support and the second support are configured to rotatably support media for processing by the media processing device.

4. The media processing device of claim 2, wherein the media centering assembly further comprises:

a first guide slot to allow the first support to translate from a first outer edge of the media centering assembly towards a center of the media centering assembly, and a second guide slot to allow the second support to translate from a second outer edge of the media centering assembly towards the center of the media centering assembly.

5. The media processing device of claim 1, wherein the first strut is biased away from the strip.

6. The media processing device of claim 1, further comprising a lid coupled to the housing, the lid configured to rotate between an open position and a closed position, wherein the lid is configured to apply a force to the first strut when the lid is in the closed position.

7. The media processing device of claim 6, wherein the force applied by the lid to the first strut is in an opposite direction than a biasing force applied against the first strut by a biasing element.

8. The media processing device of claim 1, wherein the strip comprises at least one ridge such that the first strut aligns with the at least one ridge.

9. The media processing device of claim 1, further comprising:

a lid coupled to the housing, the lid configured to rotate between an open position and a closed position, the lid is configured to apply a force to the first strut in a first direction when the lid is in the closed position to place the contact in with the resilient strip and in response to the lid being opened, the first strut is biased in a second direction causing the first strut to cease contacting the strip.

10. A media processing device comprising:

a lid movable between an open position and a closed position;

a strip; and a media centering assembly comprising:

a first support within a first guide slot, wherein the first support is configured to translate within the first guide slot;

a first strut slidably disposed within the first support; and a biasing element positioned between a surface of the first strut and the first support, the biasing element configured to bias the first strut away from the strip, wherein, in response to the lid being moved to the closed position, the lid contacts the first strut and forces the first strut against the strip and in response to the lid being moved to the open position, the biasing element force the first strut away from the strip.

11. The media processing device of claim 10, wherein the first support is unable to move when the first strut is forced against the strip.

12. The media processing device of claim 10, wherein the first support comprises a media spindle configured to support a media roll.

13. The media processing device of claim 10, wherein the media centering assembly comprises:

a second support within a second guide slot, wherein the second support is configured to translate within the second guide slot; and a second strut attached to the second support, wherein the second strut is configured to stabilize the second support.

14. The media processing device of claim 10, wherein the biasing element provides a biasing force against the lid when the lid is in the closed position.

15. The media processing device of claim 10, wherein the strip is formed of a resilient, deformable material and the strip deforms in response to the force applied through the first strut.

16. A media processing device comprising:

at least one side support comprising:

a channel;

a strut disposed within the channel, the strut being free to translate within the channel, the strut having a strut axis extending along a longest dimension of the strut; and a media spindle configured to support a media roll, the media spindle aligned with a media axis, wherein the media axis is aligned with a central axis of the media roll, wherein the media axis is substantially perpendicular to the strut axis, wherein the strut is biased to be positioned along the strut axis by default in an unlocked position.

17. The media processing device of claim 16, further comprising a media centering assembly supporting the at least one side support, the media centering assembly configured to translate along the at least one side support.

18. The media processing device of claim 16, further comprising a second side support comprising:

a second channel, a second strut disposed within the second channel, the second strut being free to translate within the second channel, and a second media spindle configured to support the media roll opposite the media spindle.

19. The media processing device of claim 16, further comprising:

a lid movable between an open position and a closed position, wherein, when the lid is in the closed position, the lid contacts the strut and braces the at least one side support.

* * * * *